US012319850B2

(12) United States Patent
Sutyak et al.

(10) Patent No.: US 12,319,850 B2
(45) Date of Patent: Jun. 3, 2025

(54) POLYURETHANE HOT MELT ADHESIVE FOR LOW TEMPERATURE APPLICATION

(71) Applicant: Henkel AG & Co. KGaA, Duesseldorf (DE)

(72) Inventors: Joann Sutyak, Plainsboro, NJ (US); Benjamin Michael Biber, New Hope, PA (US); Jignesh P. Sheth, Bridgewater, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 422 days.

(21) Appl. No.: 17/721,929

(22) Filed: Apr. 15, 2022

(65) Prior Publication Data

US 2022/0235249 A1 Jul. 28, 2022

Related U.S. Application Data

(63) Continuation of application No. PCT/US2020/052613, filed on Sep. 25, 2020.

(60) Provisional application No. 62/927,931, filed on Oct. 30, 2019.

(51) Int. Cl.

| | | |
|---|---|---|
| *C09J 175/06* | (2006.01) | |
| *C08G 18/12* | (2006.01) | |
| *C08G 18/20* | (2006.01) | |
| *C08G 18/30* | (2006.01) | |
| *C08G 18/42* | (2006.01) | |
| *C08G 18/48* | (2006.01) | |
| *C08G 18/76* | (2006.01) | |
| *C09J 175/08* | (2006.01) | |

(52) U.S. Cl.
CPC ............ *C09J 175/06* (2013.01); *C08G 18/12* (2013.01); *C08G 18/2081* (2013.01); *C08G 18/307* (2013.01); *C08G 18/4202* (2013.01); *C08G 18/4808* (2013.01); *C08G 18/7671* (2013.01); *C09J 175/08* (2013.01); *C08G 2170/00* (2013.01); *C09J 2301/304* (2020.08); *C09J 2301/306* (2020.08)

(58) Field of Classification Search
CPC ....... C09J 175/06; C09J 175/08; C08G 18/12; C08G 18/2081; C08G 18/4202; C08G 18/4808; C08G 18/307
See application file for complete search history.

(56) References Cited

U.S. PATENT DOCUMENTS

| | | | |
|---|---|---|---|
| 4,775,719 A | | 10/1988 | Markevka et al. |
| 5,599,895 A | * | 2/1997 | Heider ............... C08G 18/4018 528/80 |
| 5,869,593 A | | 2/1999 | Helmeke et al. |
| 6,020,429 A | | 2/2000 | Yang et al. |
| 6,191,212 B1 | * | 2/2001 | Kube ..................... C08G 18/12 528/73 |
| 7,635,743 B2 | | 12/2009 | Wintermantel et al. |
| 7,914,896 B2 | | 3/2011 | Kanagawa et al. |
| 8,277,601 B2 | | 10/2012 | Slark et al. |
| 10,787,596 B2 | | 9/2020 | Pillalamarri et al. |
| 2004/0143034 A1 | * | 7/2004 | Primke ..................... C08J 3/12 523/176 |
| 2004/0194881 A1 | * | 10/2004 | Hung ........................ C09J 5/06 156/331.7 |
| 2007/0213465 A1 | | 9/2007 | Brand et al. |
| 2010/0003526 A1 | | 1/2010 | Burckhardt et al. |
| 2010/0152394 A1 | | 6/2010 | Slark et al. |
| 2017/0183550 A1 | | 6/2017 | Sun et al. |

FOREIGN PATENT DOCUMENTS

| | | | | |
|---|---|---|---|---|
| CN | 1172735 | A | 2/1998 | |
| CN | 101547991 | A | 9/2009 | |
| CN | 102325853 | A | 1/2012 | |
| CN | 107109177 | A | 8/2017 | |
| CN | 110382649 | A | 10/2019 | |
| EP | 1674546 | A1 | 6/2006 | |
| EP | 1471087 | B1 | 2/2007 | |
| EP | 3315528 | A1 | 5/2018 | |
| WO | 0075209 | A1 | 12/2000 | |
| WO | WO-03060033 | A1 * | 7/2003 | ............. C08G 18/12 |
| WO | 2005090428 | A1 | 9/2005 | |
| WO | 2016138445 | A1 | 9/2016 | |
| WO | 2019031231 | A1 | 2/2019 | |

OTHER PUBLICATIONS

Handbook of Fillers, by George Wypych 3rd Edition 2009.
Handbook of Fillers and Reinforcements for Plastics, by Harry Katz and John Milewski 1978.
International Search Report for International PCT Patent Application No. PCT/US2020/052613 dated Jan. 13, 2021.

* cited by examiner

*Primary Examiner* — Michael L Leonard
(74) *Attorney, Agent, or Firm* — Sun Hee Lehmann

(57) ABSTRACT

Disclosed is a moisture reactive polyurethane hot melt adhesive composition that can be applied to substrates at a low coating weight even at application temperatures as low as 60 to 95° C. while retaining the advantageous high tack, green strength, cured bond strength and toughness of conventional high melting point polyurethane hot melt adhesives.

20 Claims, No Drawings

POLYURETHANE HOT MELT ADHESIVE FOR LOW TEMPERATURE APPLICATION

TECHNICAL FIELD

This disclosure relates generally to polyurethane hot melt adhesives and more particularly to polyurethane hot melt adhesives having a lower application temperature than conventional polyurethane hot melt adhesives while retaining the green strength and final cured strength of conventional high application temperature polyurethane hot melt adhesives.

BACKGROUND OF THE INVENTION

This section provides background information which is not necessarily prior art to the inventive concepts associated with the present disclosure.

Hot melt adhesives are solid at room temperature but, upon application of heat, they melt to a liquid or fluid state in which form they are applied to a substrate. On cooling, the adhesive regains its solid form. The hard phase(s) formed upon cooling of the adhesive imparts all of the cohesion strength, toughness, creep and heat resistance to the final adhesive. Hot melt adhesives are generally thermoplastic and can be repeatedly heated to a fluid state and cooled to a solid state. Naturally, the thermoplastic nature limits the upper temperature at which such adhesives can be used.

A different class of hot melt adhesives is reactive hot melt adhesives. Reactive hot melt adhesives are also solid at room temperature but, upon application of heat, they melt to a liquid or fluid state in which form they are applied to a substrate. Reactive hot melt adhesives start out as thermoplastic materials that can be repeatedly heated to a molten state and cooled to a solid state. However, when exposed to appropriate conditions the reactive hot melt adhesive cross-links and cures to an irreversible solid form. One class of reactive hot melt adhesives are polyurethane hot melt adhesives. Polyurethane hot melt adhesives comprise isocyanate terminated polyurethane prepolymers such as those obtained by reacting polyols with an excess of isocyanates. The polyurethane prepolymers cure through the diffusion of moisture from the atmosphere or the substrates into the adhesive, and subsequent reaction of that moisture with isocyanate moieties on the prepolymer backbone. The final adhesive product is a crosslinked material polymerized primarily through urea groups and urethane groups. Once the adhesive has crosslinked it is no longer thermoplastic and cannot be heated to a fluid state without destruction of the adhesive.

Green strength refers to initial adhesive strength of the adhesive after application of the molten adhesive to a substrate and before final full curing. High green strength is desirable as it allows bonded parts to be held together by the adhesive without further clamps or fasteners. Open time refers to the length of time after application of the molten hot melt adhesive during which a part can be bonded to the adhesive. Open time should be sufficiently long to allow the bonding substrates to be assembled together, and repositioned, if needed.

Once the structure has been assembled a high green strength is desirable to allow the bonded structures to move to the next operation. High final strength is especially advantageous in certain reactive hot melt adhesive end use applications, such as panel lamination and product assembly. Conventional polyurethane hot melt adhesives are applied at temperatures of 110° C. to 135° C. or more. The viscosity of a conventional polyurethane hot melt adhesive at about 110° C. or less will be very high, for example 40,000 cps or more. Since hot melt application equipment for flat lamination is designed to work with molten hot melt adhesives having a viscosity of approximately 20,000 cps or less it is difficult or impossible to apply conventional polyurethane hot melt adhesives at temperatures of 110° C. or less. Thus, conventional polyurethane hot melt adhesives cannot be used for some applications at temperatures of 95° C. or less.

There are substrates such as vinyl films that are damaged by exposure to hot melt adhesives applied at temperatures of 110° C. Thus, conventional polyurethane hot melt adhesives cannot be used to bond these low melting substrates.

SUMMARY OF THE DISCLOSURE

This section provides a general summary of the disclosure and is not a comprehensive disclosure of its full scope or all features, aspects or objectives.

In at least one embodiment the present disclosure provides a moisture reactive polyurethane hot melt adhesive composition prepared from a combination comprising an amorphous polyester polyol, a crystalline polyester polyol, a polyether polyol, a diisocyanate, one of a polyisocyanate having a functionality greater than 2 or a thermoplastic polyurethane having hydroxyl functionality, a catalyst and optionally one or more additives.

In at least one embodiment the present disclosure provides a moisture reactive polyurethane hot melt adhesive composition wherein the weight ratio of crystalline polyester polyol:amorphous polyester polyol is in the range of 2:1 to 1:2.

In at least one embodiment the present disclosure provides a moisture reactive polyurethane hot melt adhesive composition having an application temperature of less than 95° C. and preferably 60° C. to 80° C.

In at least one embodiment the present disclosure provides a moisture reactive polyurethane hot melt adhesive composition having an application temperature of 60° C. to 95° C., a green strength of 0.4 psi or more and a maximum viscosity of 20,000 cps at 95° C. In some embodiments the disclosure provides a moisture reactive polyurethane hot melt adhesive composition has a maximum viscosity of 15,000 cps or 12,000 cps or 10,000 cps or 8,000 cps or 5,000 cps at 95° C.

In at least one embodiment the hot melt adhesive composition further comprises an additive selected from at least one of an additional filler, a plasticizer, a catalyst, a colorant, a rheology modifier, a flame retardant, an UV pigment, a nanofiber, a defoamer, a tackifier, a curing catalyst, an anti-oxidant, an adhesion promoter, a stabilizer, a thixotropic agent, nucleating agent, moisture scavenger, additional resins and mixtures thereof.

In at least one embodiment the hot melt adhesive composition has an open time in the range of 1 minute to less than 10 minutes. In a typical embodiment the hot melt adhesive composition has an open time in the range of 1 minute to less than 6 minutes.

In one embodiment the disclosure comprises an article of manufacture comprising an uncured or cured moisture reactive polyurethane hot melt adhesive composition as disclosed above.

In one embodiment the disclosure comprises cured reaction products of a moisture reactive polyurethane hot melt adhesive composition as disclosed above.

In one embodiment the disclosure is a method of bonding two substrates comprising applying a moisture reactive polyurethane hot melt adhesive composition as disclosed above at a temperature of about 60° C. to about 95° C. to one or more substrates and disposing the substrates into contact with the applied adhesive.

The disclosed compounds include any and all isomers and steroisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

The word "about" or "approximately" as used herein in connection with a numerical value refer to the numerical value ±10%, preferably ±5% and more preferably ±1% or less.

These and other features and advantages of this disclosure will become more apparent to those skilled in the art from the detailed description of a preferred embodiment.

DETAILED DESCRIPTION OF A PREFERRED EMBODIMENT

Unless specifically noted, throughout the present specification and claims the term molecular weight when referring to a polymer refers to the polymer's number average molecular weight (Mn). The number average molecular weight Mn can be calculated based on end group analysis (OH numbers according to DIN EN ISO 4629, free NCO content according to EN ISO 11909) or can be determined by gel permeation chromatography according to DIN 55672 with THF as the eluent. If not stated otherwise, all given molecular weights are those determined by gel permeation chromatography.

Unless otherwise specified weight % or wt. % is based on weight of the moisture reactive polyurethane hot melt adhesive composition.

An adhesive's open time refers to the time during which an adhesive can bond to a material.

An adhesive's green strength refers to the initial holding strength prior to full chemical cure. In one variation green strength more particularly refers to the strength developed within 5 minutes after bonding a lauan board to a vinyl foil using the disclosed hot melt adhesive composition. In another variation green strength more particularly refers to the strength developed within 5 minutes after bonding an Azdel board to a vinyl foil using the disclosed hot melt adhesive composition. Below this level of initial strength, the green strength is generally insufficient for the bonded layers to withstand in-line finishing operations without exhibiting some debonding or delamination. Azdel is a product of Azdel Onboard in the U.S.

The present disclosure is directed toward providing reactive polyurethane hot melt adhesives that have some or all of the following properties. An application temperature in the range of 60° C. to 95° C. A maximum viscosity of 20,000 cps at 95° C. An open time of 10 minutes or less. A green strength of 0.4 or more pounds per square inch (psi), and preferably greater than 1 pound per square inch, measured 5 minutes after application from the operating temperature. A final cured mechanical strength of at least 3 psi and preferably greater than 6 psi.

In one embodiment the moisture reactive polyurethane hot melt adhesive composition is prepared from a combination comprising an amorphous polyester polyol, a crystalline polyester polyol, a polyether polyol, a diisocyanate, one of a polyisocyanate having a functionality greater than 2 or a thermoplastic polyurethane having hydroxyl functionality, a catalyst and optionally one or more additives.

Amorphous polyester polyols are polyester polyols that exhibit only a glass transition (Tg) and no substantial melting endotherm or crystallization exotherm in a DSC scan. Preferably at least one amorphous polyester polyol will have a Tg greater than 0° C. In one variation the moisture reactive polyurethane hot melt adhesive composition will comprise a mixture of at least one amorphous polyester polyol having a Tg greater than 0° C. and at least one amorphous polyester polyol having a Tg of less than 0° C.

Crystalline and/or semi-crystalline polyester polyols are polyester polyols that exhibit both a glass transition and melting and crystallization peaks in a DSC scan. In some embodiments useful crystalline and semi-crystalline polyester polyols have a melting point™ of greater than 25° C. Useful crystalline polyester polyol polymers include the Dynacoll materials available from Evonik Industries, for example Dynacoll 7490.

Preferably, the polyester polyols are used at an amorphous polyester polyol:crystalline polyester polyol ratio of 2:1 to 1:2. Below a 2:1 ratio the initial strength of the resulting adhesive will be too low to be acceptable. Above a 1:2 ratio the viscosity at 95° C. will be too high to be acceptable and the final bond strength will suffer.

Polyisocyanates, which may be used to prepare the present adhesive include f=2 diisocyanates such as alkylene diisocyanates, cycloalkylene diisocyanates, aromatic diisocyanates and aliphatic-aromatic diisocyanates and f>2 polyisocyanates. Examples of suitable polyisocyanates for use in the present disclosure include, by way of example and not limitation: methylenebisphenyldiisocyanate (MDI), isophoronediisocyanate (IPDI), hydrogenated methylenebisphenyldiisocyanate (HMDI), toluene diisocyanate (TDI), ethylene diisocyanate, ethylidene diisocyanate, propylene diisocyanate, butylene diisocyanate, trimethylene diisocyanate, hexamethylene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. Preferred polyisocyanates include methylenebisphenyl diisocyanate (MDI).

Aromatic polyisocyanates having a functionality greater than 2 (f>2) can also be optionally used to prepare the adhesive in some embodiments. Preferably, these aromatic polyisocyanates have an average functionality of 2.5 to 3.0. Useful aromatic polyisocyanates having a functionality greater than 2 include polymeric MDI, such as Rubinate M.

The moisture reactive polyurethane hot melt adhesive composition combination comprises polyether polyols including linear and branched polyethers having hydroxyl groups. Examples of the polyether polyol may include a polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct of at least one compound selected from the group ethylene glycol, propylene glycol, diethylene glycol, dipropylene glycol, triethylene glycol, 2-ethylhexanediol-1,3, glycerin, 1,2,6-hexane triol, trimethylol propane, trimethylol ethane, tris(hydroxyphenyl)propane, triethanolamine, triisopropanolamine, ethylenediamine and ethanolamine. Most preferably the polyether polyol comprises a polypropylene glycol. Typically, the polyether polyol has a number average molecular weight of greater than 300 Daltons with a preferred range of 400 to 6000 Daltons. The polyether polyol may comprise a mixture of different polyether polyols.

The adhesive can optionally include a catalyst. Some useful catalysts include, for example 2,2'-dimorpholinodiethylether, triethylenediamine, dibutyltin dilaurate and stannous octoate. In some variations the adhesive free of organometallic catalysts. A preferred catalyst is 2,2'-dimorpholinodiethylether.

The adhesive formulation can optionally include one or more of a variety of known hot melt adhesive additives such as filler; additional resins such as reactive acrylic polymer, nonreactive acrylic polymer, EVA, amorphous polyalphaolefin; plasticizer; colorant; rheology modifier; flame retardant; UV pigment; nanofiber; defoamer; tackifier; antioxidant; adhesion promoter; stabilizer; a thixotropic agent such as fumed silica; and the like. Conventional additives that are compatible with a composition according to this invention may simply be determined by combining a potential additive with the composition and determining if they are compatible. An additive is compatible if it is homogenous within the product at room temperature and at the use temperature.

Examples of useful fillers for use in the present disclosure include inorganic materials such as calcium carbonate, kaolin and dolomite. Calcium carbonate has been referred to as a non-fossil fuel based, sustainable, renewable material. Other examples of suitable fillers can be found in Handbook of Fillers, by George Wypych $3^{rd}$ Edition 2009 and Handbook of Fillers and Reinforcements for Plastics, by Harry Katz and John Milewski 1978.

Reactive acrylic polymers comprise moieties that are reactive with other materials. Examples of useful reactive acrylic polymers include Elvacite 4014 and Elvacite 2978.

Nonreactive acrylic polymers are free of moieties that are reactive with other materials. Examples of useful nonreactive acrylic polymers include Elvacite 2013 and Elvacite 2016.

Tackifiers useful in the adhesive composition are not limited. Examples of useful materials for the optional tackifier include aliphatically modified $C_9$-$C_{10}$ hydrocarbons such as Novares TK 100H, Norsolene A-90, Henghe HH2-1004; alpha methyl styrene based tackifiers such Kristalex 3100; rosin ester tackifiers such as Sylvalite RE 100L; terpene phenolic tackifiers such as Sylvarez TP2040 and mixtures thereof.

Examples of useful adhesion promoters include silane based adhesion promoters such as Silquest A-link, Dynasylan AMEO and Dynasylan AMMO.

In the Table below the components of some embodiments of the presently disclosed adhesive composition are presented. The amounts are the percentage by weight of that component based on the total adhesive weight.

| component | range wt. % | preferred range wt. % |
|---|---|---|
| amorphous polyester polyol with Tg > 0° C. | 3-30 | 8-10 |
| total amorphous polyester polyols | 3-40 | 18-30 |
| crystalline polyester polyol | 10-40 | 18-30 |
| polyether polyol | 5-50 | 10-20 |
| diisocyanate | 5-30 | 10-25 |
| polyisocyanate having a functionality greater than 2 | 0.1-3 | 0.3-1 |
| thermoplastic polyurethane having hydroxyl functionality | 0-10 | 0.5-3 |
| catalyst | 0-1 | 0.01-0.1 |
| one or more additives. | 0-70 | 0-60 |
| amorphous polyester polyol to crystalline polyester polyol ratio | 2:1 to 1:2 | 1:1 |

The hot melt adhesives according to the present disclosure can be prepared by as follows. Add functional polyols, other polymers or resins (for example, thermoplastic urethane polymer, acrylic resin) into a reactor. Optionally add defoamer, filler, plasticizer or other non-reactive additives into the reactor. Mix the components at an elevated temperature until homogeneous. Dehydrate the mixture, for example by maintaining at an elevated temperature and under vacuum. To the dehydrated mixture add the diisocyanate (f=2) with mixing, under vacuum and at a temperature of about 120 to 140° C. and allow the reaction to proceed until for 1 hour or until a desired viscosity and NCO content are reached. Subsequently, add the polyisocyanate (f>2), if desired, catalyst, pigment, colorant, stabilizer, adhesion promoter and mix under vacuum for about 30 min to 1 hour. Pack the final adhesive product into a container under an inert atmosphere to exclude moisture.

The hot melt adhesives according to the present disclosure can be applied in a variety of manners including by spraying, roller coating, via a slot die, extruding and as a bead. The disclosed hot melt adhesive is stable during storage provided moisture is excluded. The disclosed hot melt adhesive has a commercially acceptable pot life in the molten state during application. It can be applied to a range of substrates including metals, wood, plastics, glass and textiles.

The invention also provides a method for bonding articles together which comprises applying the reactive hot melt adhesive composition of the disclosure in a liquid melt form to a first article, bringing a second article in contact with the composition applied to the first article, allowing the adhesive to cool and solidify and subjecting the applied composition to conditions which will allow the composition to fully cure to a composition having an irreversible solid form, said conditions comprising moisture. The composition is typically distributed and stored in its solid form and stored in the absence of moisture to prevent curing during storage. The composition is heated to a molten form prior to application and applied in the molten form. Typical application temperatures are in the range of from about 60° C. to about 145° C. and more typically about 60° C. to about 95° C. Thus, this disclosure includes reactive polyurethane hot melt adhesive compositions in both its uncured, room temperature solid form, as it is typically stored and distributed and its molten form after it has been melted just prior to its application and in its irreversibly solid form after curing.

After application, to adhere articles together, the reactive hot melt adhesive composition is subjected to conditions that will allow it to solidify and cure to a composition that has an irreversible solid form. Solidification or setting occurs when the liquid melt begins to cool from its application temperature to room temperature. This provides green strength. Curing, i.e. chain extending, to a composition that has an irreversible solid form, takes place in the presence of ambient moisture. This provides final or cured strength.

In some embodiment the disclosed reactive hot melt adhesive provides one or more advantages over conventional reactive hot melt adhesives. The disclosed hot melt adhesive can be applied at 60-95° C. while conventional reactive hot melt adhesives are generally applied above 110° C., for example above 135° C. The disclosed hot melt adhesive has a maximum viscosity of 20,000 cps at 95° C. In some embodiments the disclosure provides a moisture reactive polyurethane hot melt adhesive composition has a maximum viscosity of 15,000 cps or 12,000 cps or 10,000 cps or 8,000 cps or 5,000 cps at 95° C. These low viscosities at 95° C. allow use in commercial application equipment at this temperature. Conventional reactive hot melt adhesives have a viscosity of 50,000-60,000 cps or more at 95° C., a viscosity too high for use in commercial application equipment to achieve a desired low coating weight. The disclosed hot melt adhesive when heated to 60 to 95° C. can be applied at a coating weight of 10 grams per square foot (gsf) or less. Conventional reactive hot melt adhesives cannot be applied at a coating weight of about 10 gsf when used at a temperature of 60 to 95° C. The disclosed hot melt adhesive provides significant green strength of at least 0.4 psi, and more preferably at least 1 psi, 5 minutes after application of 10 gsf or less, more preferably application of 7 gsf or less. Other low temperature hot melt adhesives require substantially higher coating weights to increase their green strength. The disclosed hot melt adhesive has similar cured strength to conventional reactive hot melt adhesives.

The invention is further illustrated by the following non-limiting examples.

EXAMPLES

The following components, in Table 1, were utilized in the examples that follow.

TABLE 1

| Component | |
|---|---|
| amorphous polyester polyol | Dynacoll 7130, OH # 32, Tg > 20° C. molecular weight 1750, viscosity at 130° C. 14 Pas. A solid polyester polyol at room temperature. |
| amorphous polyester polyol | Dynacoll 7230, OH number 30; Tg −30° C., molecular weight 3500, viscosity at 80° C. 10 Pas. A liquid polyester polyol at room temperature. |
| amorphous polyester polyol | Dynacoll 7250, OH number 21, Tg −50° C., molecular weight 5500, viscosity at 80° C. 5 Pas. A liquid polyester polyol at room temperature. |
| crystalline polyester polyol | Piothane 50-2000 HAI, OH number 55, Tm < 25° C., |
| crystalline polyester polyol | Dynacoll 7360, OH number 30, Tm 55° C., molecular weight 3500, viscosity at 80° C. 2 Pas. A solid polyester polyol at room temperature. |
| crystalline polyester polyol | Dynacoll 7380, OH number 30, Tm 70° C., molecular weight 3500, viscosity at 80° C. 2 Pas. A solid polyester polyol at room temperature. |
| diisocyanate f = 2 | 4,4' MDI |
| polyisocyanate having f > 2 | Rubinate M, equivalent wt. 133 |
| polyether polyol | PPG Mw 425 |
| polyether polyol | PPG Mw 1,000 |
| polyether polyol | PPG Mw 2,000 |
| thermoplastic polyurethane | Pearlbond 521, a thermoplastic polyurethane based on polycaprolactone |
| catalyst | DMDEE (dimorpholinodiethylether amine) |
| additive | Novares TK 100H tackifier |
| additive | A-Link 25 adhesion promoter |

TABLE 1-continued

| Component | |
|---|---|
| additive | Elvacite 2013 acrylic resin based on methyl methacrylate and butyl methacrylate |

Viscosity was measured using a Brookfield viscosimeter at 80° C. using a number 28 spindle and 10 rpm.

% NCO was measured by the conventional titration method.

Bond strength was measured at room temperature using a 90° peel test at a rate of 6 inches per minute. Samples were prepared and aged for either 5 minutes (short term bond strength or green strength) or 24 hours (long term bond strength or cured bond strength) before testing. Samples were tested by pulling at 90° to the bond line.

Open time was measured by drawing a 5 mil film of adhesive and pressing strips of Kraft paper onto the adhesive in intervals of 5-10 seconds. After 20 min, or when the adhesive is hardened, the paper strips are pulled off the adhesive. Paper strips applied after the open time will have less than 50% fiber tear.

Samples were prepared by roll coating adhesive to one or both substrates and pressing or nipping the coated substrates together.

The following Table lists comparative samples. Amounts are in weight percent (wt. %).

| | C1 | C2 | C3 |
|---|---|---|---|
| polyether polyol[1] | 9 | 9 | 9 |
| amorphous polyester polyol[2] | 13 | 13 | 23 |
| crystalline polyester polyol[3] | 24 | 24 | 34 |
| crystalline polyester polyol[4] | 31 | 30 | 11 |
| crystalline polyester polyol[5] | 7 | 7 | 2 |
| diisocyanate, f = 2[6] | 16 | 17 | 16 |
| catalyst[7] | 0.05 | 0.05 | 0.05 |
| % NCO | 2.7 | 2.9 | 2.6 |
| Viscosity at 80° C. (cps) | 15,000 | 13,000 | 15,000 |
| amorphous polyester polyol to crystalline polyester polyol ratio | 1:4.8 | 1:4.7 | 1:2.6 |

[1]PPG Mw 2000
[2]Dynacol 7250
[3]Piothane 50-2000 HAI
[4]Dynacol 7360
[5]Dynacol 7380
[6]MDI
[7]DMDEE Samples were made by coating each of the above samples at about 95° C. on both test substrates, contacting the coated surfaces of the test substrates and holding the contacted surfaces together for 5 minutes or 24 hours. Coating weights were 2-3 grams per square foot (gsf) on the vinyl foil and 4-5 grams per square foot on the board. The vinyl foil is a commercially available 4 to 6 mil thick product. The board is commercially available Lauan plywood or Azdel board. Sample sizes for vinyl foil and board were 1 inch by 5 inches and adhesive was applied to the entire 1 inch by 5 inch surface. Results are shown in the following Table.

| | C1 | C2 | C3 |
|---|---|---|---|
| 90° peel strength, Lauan board to vinyl foil, 5 min cure | poor | no adhesion | no adhesion |

-continued

|  | C1 | C2 | C3 |
|---|---|---|---|
| 90° peel strength, Lauan board to vinyl foil, 24 hour cure | I-SF | I-SF | I-SF |
| 90° peel strength, Azdel board to vinyl foil, 5 min cure | poor | no adhesion | no adhesion |
| 90° peel strength, Azdel board to vinyl foil, 24 hour cure | SF | SF | SF |

I-SF immediate substrate failure, immediate fiber tear of the board or the vinyl foil.
SF substrate failure - vinyl foil tears after peeling about one inch.

The following Table lists moisture reactive polyurethane hot melt adhesive composition samples. Amounts are in weight percent (wt. %).

|  | E1 | E2 | E3 | E4 | E5 | E6 | E7 | E8 |
|---|---|---|---|---|---|---|---|---|
| polyether polyol[1] | 12.5 | 12.5 | 12.5 | 12.5 | 12.7 | 12.6 | 12.8 | 12.1 |
| polyether polyol[2] | 3.0 | 3.0 | 3.0 | 3.0 | 3.0 | 3.0 | 3.1 | 2.9 |
| amorphous polyester polyol[3] | 6.9 | 13.8 | 19.4 | 10.0 | 10.2 | 10.1 | 10.2 | 9.6 |
| amorphous polyester polyol[4] | 9.3 | 18.6 | 13.0 | 13.5 | 13.7 | 13.6 | 13.8 | 12.9 |
| crystalline polyester polyol[5] | 28.4 | 14.2 | 14.2 | 22.0 | 22.3 | 22.2 | 22.5 | 21.2 |
| crystalline polyester polyol[6] | 4.0 | 2.0 | 2.0 | 3.1 | 3.2 | 3.1 | 3.2 | 3.0 |
| diisocyanate, F = 2[7] | 17.7 | 17.7 | 17.7 | 17.7 | 18.0 | 17.9 | 18.1 | 17.1 |
| polyisocyanate, F > 2[8] | 0.8 | 0.8 | 0.8 | 0.8 | 0.8 | 0 | 0 | 0.8 |
| thermoplastic urethane[9] | 1.5 | 1.5 | 1.5 | 1.5 | 0 | 1.5 | 0 | 1.5 |
| tackifier[10] | 15.3 | 15.3 | 15.3 | 15.3 | 15.5 | 15.4 | 15.7 | 15.3 |
| acrylic resin[11] | 0 | 0 | 0 | 0 | 0 | 0 | 0 | 3 |
| catalyst[12] | 0.05 | 0.05 | 0.05 | 0.05 | 0.05 | 0.05 | 0.05 | 0.05 |
| additive[13] (colorant, defoamer, adhesion promoter) | 0.6 | 0.6 | 0.6 | 0.6 | 0.6 | 0.6 | 0.6 | 0.6 |
| % NCO | 3.9 | 3.9 | 3.9 | 3.9 | 4.0 | 3.7 | 3.7 | 3.8 |
| viscosity at 80° C. (cps) | 8,000 | 18,000 | 15,000 | 13,000 | 10,000 | 13,000 | 11,000 | 16,000 |
| amorphous polyester polyol to crystalline polyester polyol ratio | 1:2 | 2:1 | 2:1 | 1:1 | 1:1 | 1:1 | 1:1 | 1:1 |

[1]PPG Mw 2000
[2]PPG Mw 425
[3]Dynacoll 7230
[4]Dynacoll 7130
[5]Dynacol 7360
[6]Dynacoll 7380
[7]4,4' MDI
[8]Rubinate M polymeric MDI
[9]Pearlbond 521
[10]Novares TK 100H tackifier
[11]Elvacite2013
[12]DMDEE
[13]Thermoplast Blue > 0.1 wt. %; Resiflow LF 0.4 wt. %; A Link 25 < 0.1 wt. %

Samples were made by coating each of the above samples at about 95° C. on test substrates, contacting the coated surfaces of the test substrates and holding the contacted surfaces together for 5 minutes or 24 hours. Coating weights were 2-3 grams per square foot (gsf) on the vinyl foil and 4-5 grams per square foot on the board. Results are shown in the following Table.

|  | E1 | E2 | E3 | E4 | E5 | E6 | E7 | E8 |
|---|---|---|---|---|---|---|---|---|
| 90° peel strength, Lauan board to vinyl foil, 5 min cure (psi) | 0.7 | nm | 1 | 2 | 1.1 | 1.1 | 0.6 | 2.6 |
| 90° peel strength, Lauan board to vinyl foil, 24 hour cure | 3.7 | nm | I-SF | I-SF | 9.3 | 10.6 | SF | I-SF |
| 90° peel strength, Azdel board to vinyl foil, 5 min cure | 0.2 | nm | 0.3 | 0.8 | 0.5 | 0.4 | 0.2 | 1.2 |
| 90° peel strength, Azdel board to vinyl foil, 24 hour cure | 1.1 | nm | 6.2 | D-SF | 5.9 | 5.1 | SF | 6.1 | nm not measured
I-SF immediate substrate failure, immediate fiber tear of the board or the vinyl foil.
SF substrate failure - vinyl foil tears after peeling about one inch.
D-SF deep substrate failure, Azdel fibers were torn out to about 2 mm depth As shown in results composition E7 with only f=2 diisocyanate (no f>2 polyisocyanate or thermoplastic urethane) provided acceptable green and cured strength on Lauan to vinyl foil bonding and acceptable cured strength on Azdel board to vinyl foil bonding. Composition E7 did not have acceptable green strength for Azdel board to vinyl foil bonding. Composition E5 comprised f=2 diisocyanate and f>2 polyisocyanate but no thermoplastic urethane. Composition E6 comprised f=2 diisocyanate and thermoplastic urethane but no f>2 polyisocyanate. Compositions E5 and E6 provided improved green and cured strength on Lauan to foil bonding compared to composition E7 and marginal green and cured strength on Azdel board to vinyl foil bonding for some applications. Composition E4 comprised all of f=2 diisocyanate; f>2 polyisocyanate and thermoplastic urethane. The surprisingly improved strengths of this composition across all materials and cure levels indicate an unexpected synergy from using all of f=2 isocyanate; f>2 polyisocyanate and thermoplastic urethane.

The present disclosure provides a moisture reactive hot melt adhesive composition that can be applied to substrates at a coating weight of 7 grams per square foot or less even at temperatures as low as 60 to 95° C. while providing high tack and green strength as well as retaining the cured bond strength and toughness of conventional high melting point PURHM.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A moisture curable, polyurethane, hot melt adhesive comprising an isocyanate functional prepolymer that is the reaction product of a mixture comprising:
    3 to 30 wt. %, based on the total weight of the hot melt adhesive, of an amorphous polyester polyol having a Tg greater than 0° C.;
    10 to 40 wt. %, based on the total weight of the hot melt adhesive, of at least one crystalline polyester polyol, wherein the at least one crystalline polyester polyol has a melting point in the range of from 20° C. to 100° C.;
    wherein the weight ratio of crystalline polyester polyol: amorphous polyester polyol is in the range of 2:1 to 1:2;
    10 to 30 wt. %, based on the total weight of the hot melt adhesive, of a diisocyanate;
    5 to 50 wt. %, based on the total weight of the hot melt adhesive, of at least one polyether polyol;
    a catalyst; and
    either:
        (i) 0.1 to 3 wt. %, based on the total weight of the hot melt adhesive, of a polyisocyanate having a functionality greater than 2, or
        (ii) 0.1 to 10 wt. %, based on the total weight of the hot melt adhesive, of a thermoplastic polyurethane having hydroxyl functionality,
    wherein:
        the weight ratio of the total amount of the at least one crystalline polyester polyol to the total amount of the amorphous polyester polyol is of from 2:1 to 1:2, and
        the hot melt adhesive has a green strength of at least 0.4 psi or more 5 minutes after application of the hot melt adhesive to a substrate at a temperature of from 60 to 95° C. and a coating weight of 10 gsf or less.

2. The moisture curable, polyurethane, hot melt adhesive of claim 1, further comprising another amorphous polyester polyol having a Tg of from −60° C. to 0° C.

3. The moisture curable, polyurethane, hot melt adhesive of claim 1, further comprising another crystalline polyester polyol different from the at least one crystalline polyester polyol and having a melting point of from 20° C. to 100° C.

4. The moisture curable, polyurethane, hot melt adhesive of claim 1, further comprising another polyether polyol different from the at least one polyether polyol.

5. The moisture curable, polyurethane, hot melt adhesive of claim 1, further comprising 10 to 30 wt. %, based on the total weight of the hot melt adhesive, of one or more additives.

6. The moisture curable, polyurethane, hot melt adhesive of claim 1, wherein the hot melt adhesive is free of organometallic catalysts.

7. The moisture curable, polyurethane, hot melt adhesive of claim 1, wherein the weight ratio of the total amount of the at least one crystalline polyester polyol to the total amount of the amorphous polyester polyol is 1:1.

8. The moisture curable, polyurethane, hot melt adhesive of claim 1, wherein the hot melt adhesive has a Lauan board to vinyl foil green strength of 1.0 psi or more.

9. The moisture curable, polyurethane, hot melt adhesive of claim 1, wherein the hot melt adhesive has an Azdel board to vinyl foil green strength of 0.4 psi or more.

10. The moisture curable, polyurethane, hot melt adhesive of claim 9, wherein the hot melt adhesive has an Azdel board to vinyl foil green strength of 0.8 psi or more.

11. A moisture curable, polyurethane, hot melt adhesive comprising an isocyanate functional prepolymer that is the reaction product of a mixture comprising:
    3 to 30 wt. %, based on the total weight of the hot melt adhesive, of an amorphous polyester polyol having a Tg greater than 0° C.;
    10 to 40 wt. %, based on the total weight of the hot melt adhesive, of at least one crystalline polyester polyol, wherein the at least one crystalline polyester polyol has a melting point of from 20° C. to 100° C.;
    either:
        10 to 30 wt. %, based on the total weight of the hot melt adhesive, of a diisocyanate, or
        5 to 50 wt. %, based on the total weight of the hot melt adhesive, of at least one polyether polyol;
    a catalyst;
    0.1 to 3 wt. %, based on the total weight of the hot melt adhesive, of a polyisocyanate having a functionality greater than 2; and
    0.1 to 10 wt. %, based on the total weight of the hot melt adhesive, of a thermoplastic polyurethane having hydroxyl functionality,
    wherein:
        the weight ratio of the total amount of the at least one crystalline polyester polyol to the total amount of the amorphous polyester polyol is of from 2:1 to 1:2, and
        the hot melt adhesive has a green strength of at least 0.4 psi or more 5 minutes after application of the hot melt adhesive to a substrate at a temperature of from 60 to 95° C. and a coating weight of 10 gsf or less.

12. A cured reaction product comprising the moisture curable, polyurethane, hot melt adhesive of claim 1.

13. An article comprising the moisture curable, polyurethane, hot melt adhesive of claim 1.

14. An article comprising the cured reaction product of claim 12.

15. The moisture curable, polyurethane, hot melt adhesive of claim 1, wherein the hot melt adhesive has a maximum viscosity of 12,000 cps at 95° C.

16. The moisture curable, polyurethane, hot melt adhesive of claim 15, wherein the hot melt adhesive has a maximum viscosity of 5,000 cps at 95° C.

17. A method of coating a substrate, the method comprising:
    heating the moisture curable, polyurethane, hot melt adhesive of claim 1 to a temperature of from 60 to 95° C.; and
    coating the heated moisture curable, polyurethane, hot melt adhesive onto a coating surface of a first substrate at a coating weight of 10 grams per square foot (gsf) or less.

18. The moisture curable, polyurethane, hot melt adhesive of claim 11, wherein the weight ratio of the total amount of the at least one crystalline polyester polyol to the total amount of the amorphous polyester polyol is 1:1.

19. The moisture curable, polyurethane, hot melt adhesive of claim 11, further comprising one or more additives.

20. A moisture curable, polyurethane, hot melt adhesive comprising an isocyanate functional prepolymer that is the reaction product of a mixture comprising:
- about 13.5 wt. %, based on the total weight of the hot melt adhesive, of an amorphous polyester polyol having a Tg greater than 0° C.;
- about 25 wt. %, based on the total weight of the hot melt adhesive, of at least one crystalline polyester polyol, wherein the at least one crystalline polyester polyol has a melting point of from 20° C. to 100° C.;
- about 18 wt. %, based on the total weight of the hot melt adhesive, of a diisocyanate;
- about 15.5 wt. %, based on the total weight of the hot melt adhesive, of at least one polyether polyol;
- a catalyst;
- either:
  - (i) about 0.8 wt. %, based on the total weight of the hot melt adhesive, of a polyisocyanate having a functionality greater than 2, or
  - (ii) about 1.5 wt. %, based on the total weight of the hot melt adhesive, of a thermoplastic polyurethane having hydroxyl functionality; and one or more additives, wherein:
- the hot melt adhesive has a green strength of at least 0.4 psi or more 5 minutes after application of the hot melt adhesive to a substrate at a temperature of from 60 to 95° C. and a coating weight of 10 gsf or less.

* * * * *